April 27, 1965

L. L. POURCIAU 3,181,077

GRATING GENERATOR

Filed May 1, 1961

INVENTOR.
LOUIS L. POURCIAU

BY H. S. Mackey

ATTORNEY.

United States Patent Office 3,181,077

Patented Apr. 27, 1965

3,181,077

GRATING GENERATOR

Louis L. Pourciau, Pleasantville, N.Y., assignor to General Precision, Inc., a corporation of Delaware Filed May 1, 1961, Ser. No. 106,735
2 Claims. (Cl. 328—188)

Figure 2:
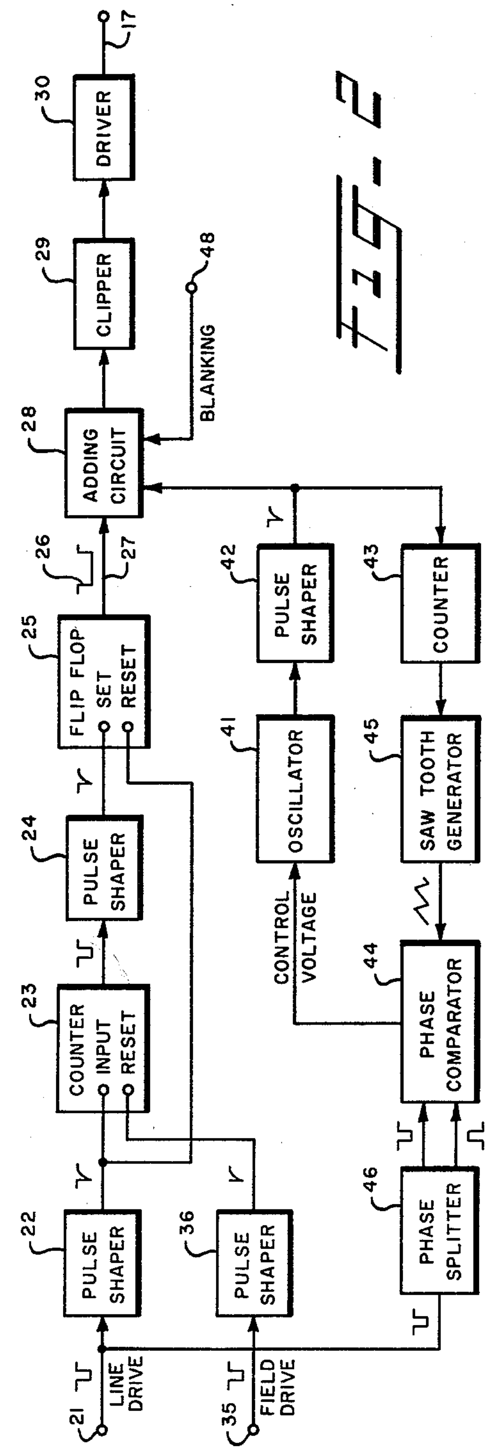

This invention relates generally to television test equipment and particularly to equipment for generating a pattern of bars and/or dots for testing television cameras and monitors.

Bar or dot generators, also called cross-hatch generators or grating generators, are widely used to test both the horizontal and vertical linearity of television cameras and monitors. Such generators create a series of video pulses of such duration and spacing that, when applied to a television monitor, a series of horizontal and vertical bars or dots appears on the screen.

Various ways are known for generating the required video pulses. For example, the horizontal bars may be generated by multiplying the field drive (vertical synchronizing) pulses by any desired number and using each of the resulting pulses to generate a pulse having the duration of a horizontal line. Such an arrangement has the disadvantage that each bar may not start at the beginning of a horizontal line and also has the further disadvantage that the spacing between bars may not be completely uniform since the oscillator or other multiplying device is synchronized only once each field. As another example, the horizontal bars may be generated by counting the line drive (horizontal synchronizing) pulses and generating a pulse having the duration of one horizontal line every *n*th pulse. However, if the horizontal bars are to remain stationary on the screen, the number of bars must be limited to an exact divisor of the number of lines per frame.

Vertical bars have been obtained by multiplying the line drive pulses by any desired number so as to generate a sharp pulse several times each horizontal line. However, the oscillator or other multiplying device is ordinarily synchronized only once per line and accordingly the linearity is not always sufficient for critical applications. Another possibility is to multiply the field drive pulses a sufficient number of times to generate several pulses per line but this arrangement also is not always as accurate as desired. Additionally, difficulty arises because the frequency of the line drive pulses is not usually an integral multiple of the frequency of the field drive pulses.

It is a general object of the present invention to provide an improved grating generator.

Another object is to provide a grating generator having improved accuracy of the timing of both the vertical and horizontal bars.

Another object is to provide a grating generator which can be arranged to generate any desired number of horizontal and/or vertical bars.

Briefly stated, the apparatus of the present invention generates the vertical bars by means of an oscillator running at a frequency which is an integral multiple of the line drive pulse repetition frequency. A binary divider connected to the output of the oscillator generates pulses at the same integral divisor frequency. The phase of these pulses is compared with the phase of the line drive pulses in a circuit which generates a control voltage which controls the frequency of the oscillator continuously. The horizontal bars are generated by counting the line drive pulses with a binary divider and generating a wide pulse for every *n*th line drive pulse. To allow generation of a number of horizontal bars which number is not an integral divisor of the number of lines per frame, the binary divider counter is reset to a predetermined count by every field drive pulse.

Figure 1:
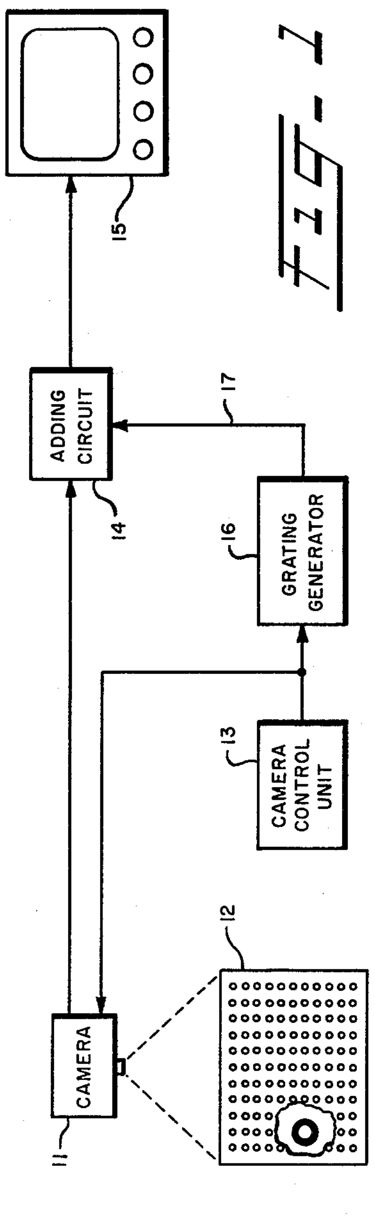

For a clearer understanding of the invention reference may be made to the following detailed description and the accompanying drawing in which:

FIGURE 1 is a block diagram showing a typical environment in which the invention may be used; and FIGURE 2 is a block diagram of a grating generator in accordance with the invention.

Referring first to FIGURE 1, there is shown a typical environment of the invention. There is shown a television pick-up camera 11 which is positioned to view a mask 12 consisting of a transparent sheet containing a matrix of horizontal and vertical marks. Each mark is like the one shown enlarged and consists of two concentric circles, the space between being black, leaving a matrix of small transparent circles. The mask is preferably placed over a white background. A camera control unit 13 generates control signals comprising field drive, line drive and blanking pulses. The camera control unit 13 is connected to the camera 11 which generates a composite video signal including a picture portion indicative of the mask 12 in addition to the usual synchronizing pulses. The video signal from the camera 11 is applied through an adding circuit 14 to a television monitor 15 which is to be tested.

A grating generator 16 is also connected to the camera control unit 13 and generates a video signal comprising voltages suitable for placing on the screen on the monitor 15 a series of horizontal and vertical bars equal in number to the horizontal and vertical rows of marks on the mask 12. This signal is applied through a conductor 17 to the adding circuit 14 and then to the monitor 15.

The linearity of the camera is measured by observing the departure of the intersections of the horizontal and vertical bars from the centers of each of the small circles.

Alternatively, the camera 11 could be omitted and the mask 12 could be placed directly over the screen of the monitor 15 and the linearity of the monitor measured.

The grating generator 16 may be most readily understood by considering a specific embodiment designed for use with a television system having particular standards. It will be understood, however, that the invention is equally applicable to television systems having other standards.

The embodiment selected for illustrative purposes has been designed for use with a television system employing interlaced scanning using 945 lines per frame, two fields per frame, having a line frequency of 28,350 c.p.s. and a field frequency of 60 c.p.s. In this system approximately 48 horizontal lines are blanked out during vertical retrace. The grating generator is required to provide 11 visible horizontal bars and 11 visible vertical bars.

Referring now to FIGURE 2, the terminal 21 receives the line drive pulses, each of which is a narrow substantially rectangular pulse and the repetition frequency of which is 28,350 c.p.s. These pulses are applied to a pulse shaping circuit 22, such as a differentiating circuit, which provides as an output a pulse having a steep leading edge. The latter pulses are applied to the input terminal of a counter 23. This counter may be any of several well known types but is preferably a binary counter comprising a chain of flip-flop circuits connected in series and having appropriate feedback loops to obtain the desired count. In the particular embodiment being described, the counter 23 is adjusted to emit one output pulse and to reset itself to zero each time a count of 40 is reached.

The pulses from the counter 23 are passed through a pulse shaping circuit 24, similar to the circuit 22, and are applied to the "set" input of a flip-flop circuit 25. The occurrence of a pulse on this input changes the state of the flip-flop and starts the generation of a wide voltage pulse 26. The "reset" terminal of the flip-flop circuit 25 is connected to the output of the pulse shaping circuit 22 so that the next line drive pulse returns the flip-flop to its former state. The result is the generation of a voltage pulse having a duration approximately equal to the duration of one horizontal line.

It might be thought at first glance that each output pulse from the circuit 24 would occur concurrently with a line drive pulse from the circuit 22 and that both pulses would act on the flip-flop 25 simultaneously. However, the counter 23 and the pulse shaping circuit 24 introduce sufficient delay so that the pulse applied to the "set" input arrives slightly later than the corresponding line drive pulse and, therefore, the flip-flop 25 is triggered successfully.

The result of the foregoing circuitry is that one pulse having a duration approximately equal to the duration of one horizontal line appears on conductor 27 for every 40 line drive pulses. Each pulse starts just after the end of a line and continues throughout the visible portion of the next line. These pulses are passed through an adding circuit 28, about which more will be said later, a clipping circuit 29 which adjusts the amplitude, and a driving circuit 30, such as a cathode follower, to the video output conductor 17.

With the apparatus so far described, a pulse appears every 40 lines. Since neither the number of lines per field nor the number of lines per frame is integrally divisible by 40, the lines would not appear on the same portion of the screen on successive fields and frames. This objection is overcome by resetting the counter 23 at the end of each field. The field drive pulses which appear on terminal 35 are passed through a pulse shaping circuit 36, similar to the circuit 22, and thence to the "reset" terminal of the counter 23. The "reset" terminal is connected to the proper portion of the chain within the counter so that the application of a pulse thereto sets the counter to a count of 20. Thus, the counter emits a pulse after the first 20 lines so that the first wide pulse 26 is generated at the 20th line. This occurs during vertical blanking since approximately 48 lines are blanked out immediately after the end of each field. The next pulse occurs at the 60th line which is approximately 12 lines into the picture. Succeeding pulses occur at 40 line intervals, the last occurring at the 460th line. At the middle of the 472nd line a field drive pulse initiates vertical retrace, resets counter 23 and the cycle is repeated.

Vertical bars are generated with the aid of an oscillator 41 operating at a frequency of 368.55 kc.p.s. which is 13 times the line drive frequency. The oscillator 41 may be of any various types but must be controllable in frequency preferably by means of a control voltage. In the present embodiment a blocking oscillator controlled by a unidirectional voltage has been found satisfactory. The output of the oscillator is passed through a pulse shaping circuit 42, simliar to the circuit 22, and is then applied to the input of a counter 43. This counter may, for example, be a binary counter and generates one output pulse for each 13 input pulses, thus, effectively dividing the oscillator frequency by 13 to equal the frequency of the line drive pulses. This frequency is compared to the frequency of the line drive pulses by means of a comparison circuit 44 which generates a control voltage indicative of any difference in the two frequencies. This control voltage in turn controls the frequency of the oscillator 41. The comparison circuit 44 may be a phase comparator employing two diodes in a bridge arrangement and a smoothing network to smooth the control voltage output. The pulse output of the counter 43 triggers a sawtooth waveform generator 45, the output of which is applied to one input of the phase comparator 44. The line drive pulses from terminal 21 are applied to a phase splitting circuit 46, such as a split-load vacuum tube, which generates pulses 180° out of phase with each other, which pulses are applied to the other input of the phase comparator 44. The output of the phase comparator then is a voltage indicative of the phase of the sawtooth waveform relative to the line drive pulses.

The output of the pulse shaping circuit 42 is also applied to the adding circuit 28 which combines these pulses with the long pulses 26 to generate a composite video signal. The pulses from the pulse shaper 42 occur 13 times per horizontal line resulting in the generation of 13 vertical bars. However, the blanking pulses occupy approximately six microseconds per line and, accordingly, two of the 13 pulses occur during horizontal blanking, leaving 11 bars visible.

As noted above, one horizontal bar and two vertical bars are generated during the normal blanking intervals. It is desirable to add blanking to the video signal to prevent the application of the horizontal and vertical bar pulses during horizontal and vertical retrace periods. This may be done simply by applying blanking pulses from the terminal 48 as an additional input to the adding circuit 28.

From the foregoing it is apparent that applicant has provided an improved grating generator. The spacing of the horizontal bars are as accurate as the master oscillator which generates the synchronizing pulses. The number of bars generated may be varied readily by adjusting the count of the counter 23. There is no restriction as to the number of horizontal bars which may be generated. The vertical position of the horizontal bars on the screen of the monitor may be adjusted by selecting the count to which the counter 23 is reset by the field drive pulses. The vertical bars are accurately positioned because of the continuous control of the frequency of the oscillator 41. Any number of vertical bars can be generated by selecting or adjusting the frequency of the oscillator 41 and the count of the counter 43.

While a preferred embodiment of the invention has been described in considerable detail, many modifications may be made within the spirit of the invention. For example, as previously mentioned, the invention is readily adaptable to television systems having other standards, such as 525 line systems, or may be arranged to generate different numbers of horizontal and vertical bars. Additionally, the apparatus may be arranged to generate dots instead of bars by including a coincidence tube within the adding circuit 28. Many other modifications will occur to those skilled in the art. It is therefore desired that the protection afforded by Letters Patent be limited only by the true scope of the appended claims.

What is claimed is:

1. A grating generator controlled by a source of a series of television line drive pulses and a series of television field drive pulses, comprising, a pulse counting circuit for generating an output pulse each time the count of said circuit reaches a first predetermined number, means for applying said series of line drive pulses as an input of said counting circuit, means jointly controlled by the output of said counting circuit and by said series of line drive pulses for generating a first series of voltage pulses each having a duration approximately equal to the period of said series of line drive pulses, means for setting the count of said counting circuit to a second predetermined number upon the occurrence of each of said field drive pulses, an oscillator, means for generating from the output of said oscillator a second series of pulses having a repetition frequency equal to the frequency of said oscillator, means for controlling the frequency of said oscillator in accordance with the repetition frequency of said series of line drive pulses, and means for combining said first and second series of pulses to form a composite signal.

2. A grating generator controlled by a source of a series of television line drive pulses, comprising, a counting circuit for generating an output pulse each time the count of said circuit reaches a predetermined number, means for applying said series of line drive pulses as an input to said counting circuit, means jointly controlled by the output of said counter and by said series of line drive pulses for generating a first series of voltage pulses each having a duration approximately equal to the period of said series of line drive pulses, an oscillator, means for generating from the output of said oscillator a second series of voltage pulses having a repetition frequency equal to the frequency of said oscillator, means for generating an alternating voltage the frequency of which is an integral divisor of the frequency of said oscillator, means for controlling the frequency of said oscillator so as to maintain the frequency of said alternating voltage equal to the repetition frequency of said series of line drive pulses, and means for combining said first and said second series of voltage pulses to form a composite signal.

References Cited by the Examiner

UNITED STATES PATENTS

| | | | |
|---|---|---|---|
| 2,201,978 | 5/40 | Bedford | 331—21 |
| 2,209,507 | 7/40 | Campbell | 331—21 |
| 2,250,284 | 7/41 | Wendt | 331—21 |
| 2,389,025 | 11/45 | Campbell | 331—21 |
| 2,389,948 | 11/45 | Bartels | 331—21 |
| 2,486,491 | 11/49 | Meacham | 328—106 |
| 2,551,280 | 5/51 | Moe | 328—58 X |
| 2,645,717 | 7/53 | Massman | 331—20 |
| 2,743,419 | 4/56 | Chatterton et al. | 328—136 X |
| 2,863,057 | 12/58 | Kraft | 331—20 |
| 2,868,975 | 1/59 | Harriss et al. | 331—20 X |
| 2,881,388 | 4/59 | Behrend | 328—188 |
| 2,888,557 | 5/59 | Schneider | 307—88.5 |
| 2,889,468 | 6/59 | Crosby | 307—88.5 |
| 2,903,605 | 9/59 | Barney et al. | 328—58 X |
| 2,912,651 | 11/59 | Leeds | 331—20 X |
| 2,970,226 | 1/61 | Skelton et al. | 307—88.5 |
| 3,030,581 | 4/62 | Johnson | 328—43 |

JOHN W. HUCKERT, *Primary Examiner.*

HERMAN KARL SAALBACH, ARTHUR GAUSS, *Examiners.*